United States Patent
Bobillier et al.

(10) Patent No.: US 11,432,647 B2
(45) Date of Patent: Sep. 6, 2022

(54) FURNITURE CARCASS

(71) Applicant: INOVAME, Molsheim (FR)

(72) Inventors: Vincent Bobillier, Strasbourg (FR); Yann Theil, Neubois (FR); Jacky Fendenheim, Kertzfeld (FR); Thierry Miclo, Hoenheim (FR)

(73) Assignee: INOVAME, Molsheim (FR)

( * ) Notice: Subject to any disclaimer, the term of this patent is extended or adjusted under 35 U.S.C. 154(b) by 796 days.

(21) Appl. No.: 16/320,167

(22) PCT Filed: Jul. 7, 2017

(86) PCT No.: PCT/FR2017/051855
§ 371 (c)(1),
(2) Date: Jan. 24, 2019

(87) PCT Pub. No.: WO2018/020097
PCT Pub. Date: Feb. 1, 2018

(65) Prior Publication Data
US 2019/0269240 A1    Sep. 5, 2019

(30) Foreign Application Priority Data
Jul. 26, 2016 (FR) .................................. 1657150

(51) Int. Cl.
*A47B 47/04* (2006.01)
*F16B 12/12* (2006.01)
(Continued)

(52) U.S. Cl.
CPC .......... *A47B 47/042* (2013.01); *F16B 12/125* (2013.01); *F16B 12/24* (2013.01);
(Continued)

(58) Field of Classification Search
CPC .......... A47B 47/042; A47B 2230/0077; A47B 2230/0081; F16B 5/0008; F16B 5/0012;
(Continued)

(56) References Cited

U.S. PATENT DOCUMENTS 861,911 A     7/1907  Stewart et al.
7,997,044 B2 * 8/2011  Green .................. A47B 96/202
                                              52/631
(Continued)

FOREIGN PATENT DOCUMENTS

EP     0738570 A1 * 10/1996 ............. E06B 3/984
EP     1096096 A2 *  5/2001 ........... E06B 3/9642
(Continued)

OTHER PUBLICATIONS

Miclo, Furniture Carcass, Sep. 25, 2013, Google Patents Translation of EP 2641505 A1 (Year: 2013).*
(Continued)

*Primary Examiner* — Josh Skroupa
*Assistant Examiner* — Zachary A Hall
(74) *Attorney, Agent, or Firm* — Renner, Kenner, Greive, Bobak, Taylor & Weber

(57) ABSTRACT

Furniture carcass formed from panels assembled edge to edge by means of a groove (21) and loose tongue (11) assembly, a first (10) and a second panel (20) being joined by the edge of the first panel (10) hearing against the inner side (20a) of the second panel (20). The first panel (10) comprises a loose tongue (11), and the second panel (20) comprises, along the edge of its inner side (20a), a recess (21), complementary in shape to that of the edge with the bearing surface (15), a longitudinal assembly groove (21), complementary in shape to that of the tongue (11), and, beyond the groove (21), a bearing surface (25), recessed relative to the plane of its inner side (20a), for receiving the (Continued)

Figure 1:
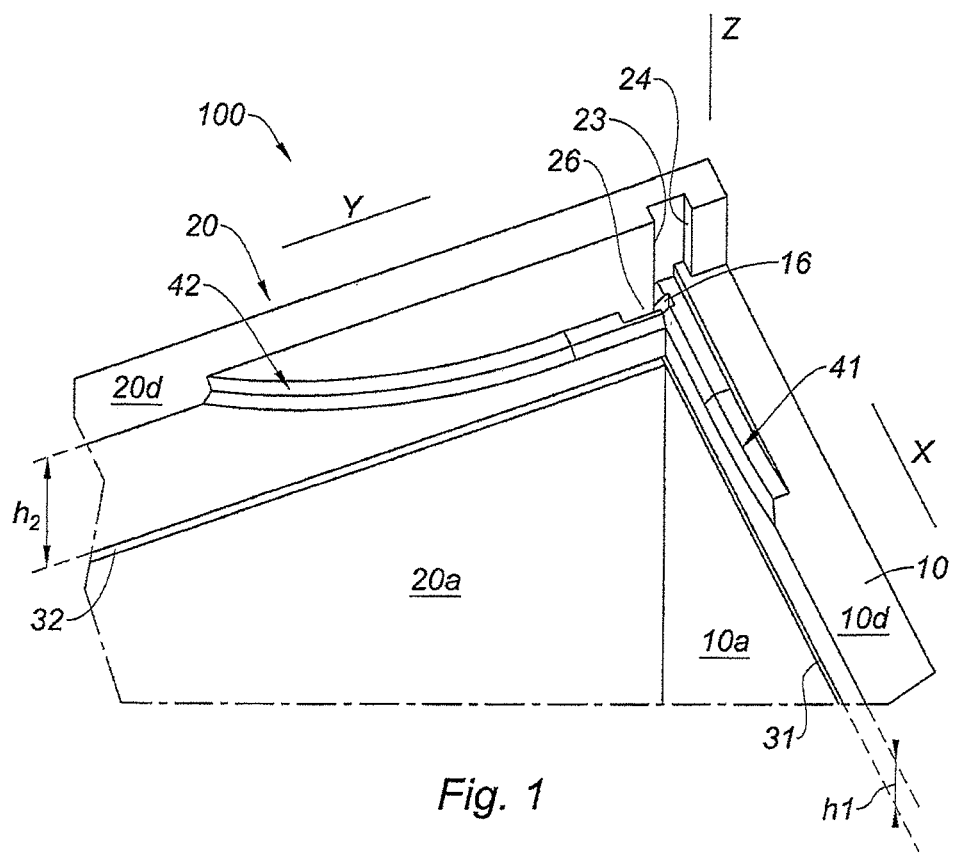

edge tearing surface (15). The assembly groove (21) has a bottom surface (22) and a small bearing surface (24) joined by a truncated concave ridge (27) and the loose tongue (11) has a complementary truncated ridge (17).

9 Claims, 7 Drawing Sheets

(51) Int. Cl.
*F16B 12/24* (2006.01)
*F16B 12/26* (2006.01)
*F16B 12/46* (2006.01)

(52) U.S. Cl.
CPC .............. *F16B 12/26* (2013.01); *F16B 12/46* (2013.01); *A47B 2230/0077* (2013.01); *A47B 2230/0081* (2013.01); *F16B 2012/466* (2013.01)

(58) Field of Classification Search
CPC ...... F16B 5/0016; F16B 5/002; F16B 12/125; F16B 12/24; F16B 12/26; F16B 12/46; F16B 2012/466; Y10T 403/587; Y10T 403/7018; Y10T 403/7021; Y10T 403/7024; Y10T 403/7037
See application file for complete search history.

(56) References Cited

U.S. PATENT DOCUMENTS

| | | | |
|---|---|---|---|
| 8,641,155 B2* | 2/2014 | Lee | A47B 47/005 |
| | | | 312/110 |
| 10,017,948 B2* | 7/2018 | Boo | E04C 2/40 |
| 10,138,636 B2* | 11/2018 | Pervan | E04F 15/02038 |
| 10,968,936 B2* | 4/2021 | Boo | F16B 12/10 |
| 2012/0279161 A1* | 11/2012 | Hakansson | F16B 12/26 |
| | | | 52/588.1 |
| 2016/0174704 A1* | 6/2016 | Boo | A47B 47/0066 |
| | | | 312/265.5 |

FOREIGN PATENT DOCUMENTS

| | | | | |
|---|---|---|---|---|
| EP | 2641505 A1 | 9/2013 | | |
| FR | 2944728 A1 * | 10/2010 | | B27F 1/00 |
| FR | 2975717 A1 * | 11/2012 | | E04F 15/02038 |
| FR | 2988274 A1 * | 9/2013 | | F16B 12/125 |
| WO | WO-2013021031 A1 * | 2/2013 | | F16B 5/0016 |
| WO | 2015105449 A1 | 7/2015 | | |
| WO | WO-2015171068 A1 * | 11/2015 | | A47B 47/0075 |
| WO | 2016059549 A2 | 4/2016 | | |

OTHER PUBLICATIONS

International Search Report, dated Jul. 26, 2016, for International App. No. PCT/FR2017/051855.

* cited by examiner

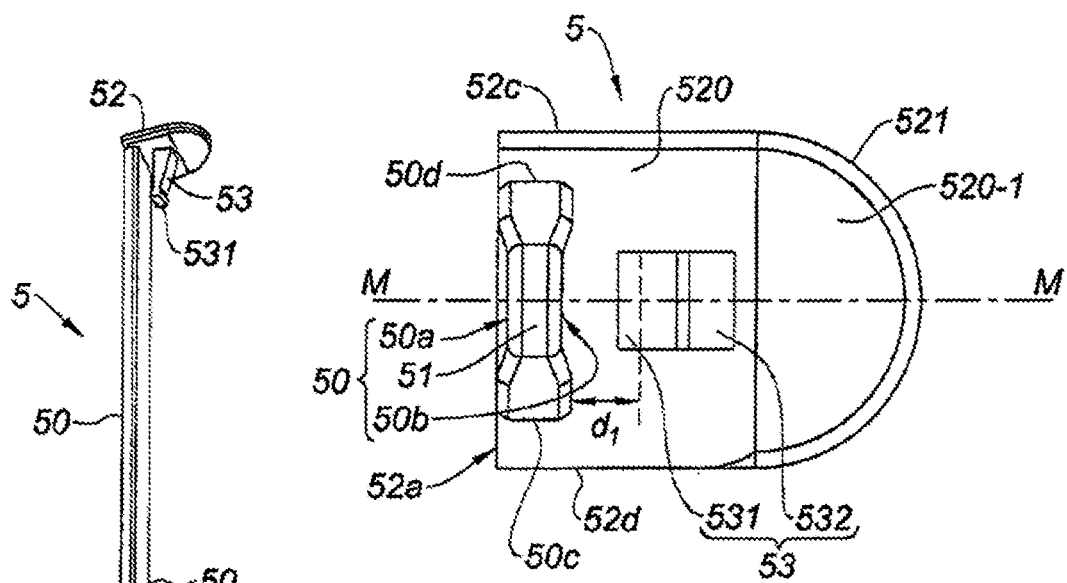
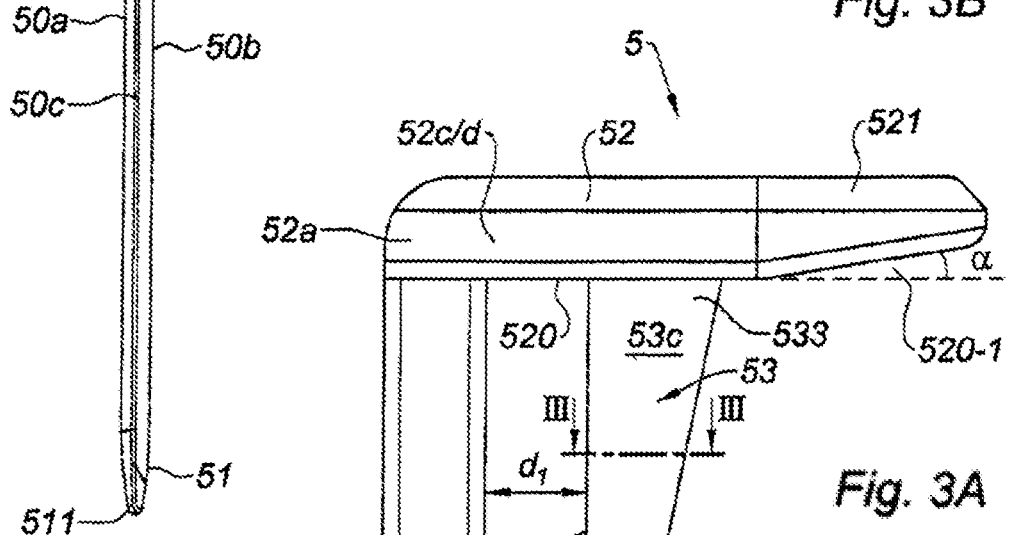
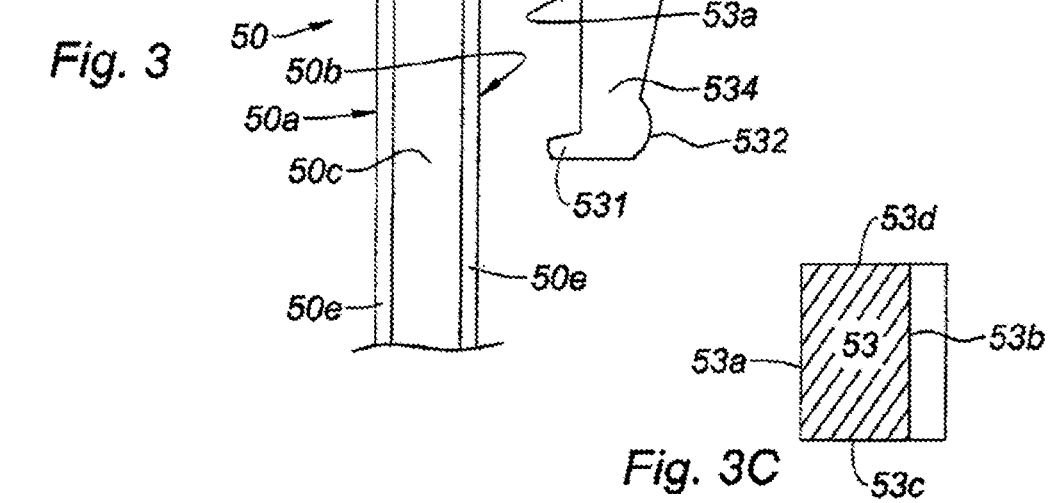

FURNITURE CARCASS

FIELD OF THE INVENTION

The present invention refers to a furniture carcass comprising panels assembled edge to edge by the loose tongue and groove method and having a bottom sliding into the grooves of the panels and in which each pair consisting of a first and a second panel are assembled by the edge of the first panel which abuts on the inner side of the second panel to form a dihedral. On its edge, the first panel has, along its inner side, a loose tongue leaving an advanced bearing surface and having locking groove at the base of the tongue, along the inner side of the first panel. Along the edge of its inner side, the second panel has a shape complementary to that of the edge of the first panel with, on the one hand, an assembly groove running longitudinally to receive the loose tongue and on the other, beyond the groove, a bearing surface standing back from the plane of the inner side receiving the advanced bearing surface and a locking groove in a position matching that of the first panel and having a complementary shape so that, when the two panels are assembled, the two locking grooves match one another and form a channel into which a locking device consisting of a rod is inserted, reversibly locking the assembly.

STATE OF THE TECHNIQUE

We already know of a furniture carcass of this type from document EP 2 641 505.

This furniture carcass is an advantageous and simple design but may have the drawback of a risk of incipient breaks on the assembly of the edges of the two panels if the assembly is forced on a slightly different dihedral angle from the design angle provided for (in general, 90°); indeed, if the person assembling the panels joins two panels at a slightly more open angle than the design angle (that is 90°), the forcible insertion of the loose tongue could cause incipient breaks at the bottom of the assembly groove. The same risk of incipient breaks developing also exists if the locking device is forced into the channel or if it is extracted from it, in a forcible extraction direction which is not in exact alignment with the channel.

This type of situation occurs more particularly in kitchen installations.

It would also be interesting to be able to disassemble the carcass more easily, that is, to unlock the assemblies of the four edges as a way of converting an installation, or for removals. There are also various solutions for the assembly of such carcasses, for instance according to the documents U.S. Pat. Nos. 4,047,777, 6,045,290 or US 2004/0253051. But these various assembly solutions are more complex to manufacture; the same applies to the implementation of the assembly of the panels forming the carcasses.

PURPOSE OF THE INVENTION

The purpose of this invention is to develop a furniture carcass formed from panels assembled edge-to-edge of the type defined above, locking together in a particularly simple manner, and unlocked in the same way, for the conversion of an installation without any inaccurate or forcible movements causing incipient breaks in the assembly, both during assembly and the disassembly for subsequent reassembly.

OUTLINE AND ADVANTAGES OF THE INVENTION

For this purpose, the invention refers to a furniture carcass comprising panels assembled edge to edge by the loose tongue and groove method and having a bottom sliding into the grooves of the panels in which a first and a second panel are assembled by the edge of the first panel which abuts on the inner side of the second panel to form a dihedral, A On its edge, along its inner side, the first panel has a loose tongue leaving an advanced bearing surface and has a locking groove at the base of the along the inner side of the first panel, B Along the edge and on the inner side, the second panel has a groove, complementary in shape to that of the edge of the first panel with, on the one hand, a longitudinal assembly groove whose shape matches that of the tongue that it receives, and on the other, beyond the groove, a bearing surface recessed from the plane of the inner side, to receive the advanced bearing surface.

the assembly groove is edged by:
an inner bearing surface divided into two parts by the locking groove,
an assembly groove bottom surface receiving the bearing surface of the edge of the other panel,
a small bearing surface parallel to the inner bearing surface connecting the bottom surface to the recessed bearing surface,
the surfaces of the assembly groove are connected by an inner truncated concave ridge
the section of the tongue and its truncated ridge on the first panel are defined from the section of the rails of an assembly and that of the truncated ridge of the second panel, C the locking groove of the second panel, parallel to the distance from the inner side, and opening into the groove in a position complementing that of the locking groove of the first panel when the two panels are assembled, with the loose tongue entering the groove and the bearing surface applied against the outer bearing surface so that the locking grooves match to form a channel receiving a locking device.

This shape of the assembly parts avoids any incipient breakage in the event of inaccurate or forcible initial assembly at a dihedral angle, even slightly deformed. The elasticity of the truncated inner ridge of the assembly groove prevents an incipient break from being generated at the connecting point of the groove bottom surface and the small bearing surface because of the continuity of the surfaces obtained through the truncated ridge. The assembly of the two panels and, more generally of the four dihedrals of the carcass thus offer elastic resistance to any deformation applied to the dihedral.

This may be the case if the carcass falls and is deformed slightly by the shock because, even if it falls on a corner, the four dihedrals are concerned and make the assembly more fragile. There is indeed a risk of incipient breaks forming during the assembly or disassembly of a dihedral shape, even if the carcass has been assembled; the risk exists at the same time for all the dihedral shapes because the deformation of any one of them automatically causes the deformation of the three others. This risk is avoided by the invention.

According to another characteristic, the truncated ridge of the groove has a concave rounded section and the truncated ridge on the tongue has a convex rounded section, matching that of the ridge of the groove.

This truncated sectional shape is particularly advantageous to produce and use for the concave part and the convex part.

According to another advantageous characteristic, the locking device includes:

A board forming a handle the underside of which is plane to form a bearing surface on the assembled sides, around that the opening of the channel, A blade integral with the underside of the board, having a cylindrical shape and a rectilinear section adapted to that of the channel for sliding into the channel and locking the assembly of the two panels, An attaching tab integral with the underside and ending in a clipping nose turned towards the blade and designed to clip into the groove of an assembly panel receiving the bottom of the carcass when the locking device is installed, the clipping nose being at a distance from the underside of the board corresponding to the distance included between the bearing surface of the sides around the opening of the channel and the groove receiving the bottom.

The locking device according to the invention is a particularly simple embodiment, for the production of the component parts and especially for the panel ridge assembly means and the locking devices used to lock the assemblies made together.

The invention can be used for building carcasses the bottom of which is at a certain distance from the bottom of the carcass in order to form a technical gap sufficiently deep to absorb the relief design of a wall or partition against which the carcass or a set of carcasses is placed.

The panels are particularly easy to lock after their assembly because the locking device slides into each locking channel, while pressing against the stop board. Locking can be gradual, that is not definitive, at two or three of the assemblies, for instance, to allow the installation of the carcass bottom then install the last side of the carcass and lock the assembly with the four locking devices some of which will already have been installed, at least partially, to preserve a degree of freedom.

This incomplete installation before the final assembly of the panels is advantageous to square up the various panels and avoid locking some of the clearances that might be needed for the accurate alignment of the carcass.

Although the carcass described above is a parallelepiped carcass, generally having a rectangular cross-section, the carcass can also be a polygonal section cylinder with more than four sides in which the loose grooves and tongues then allow for the specific orientation for such a polygonal section carcass, for instance shaped as a diamond, pentagon or hexagon. The clipping in of the locking nose guarantees the accurate positioning of the locking blade in the channel, preventing it from coming loose, even to the detriment of the locking of the assembly.

According to one advantageous characteristic, the locking tab is in the form of a truncated pyramid the large base of which is connected under the board and the small base of which ends in the nose.

According to one advantageous characteristic, the blade of the locking device is a cylindrical rod having a rectangular section with rounded edges. This section is suited to the section of the channel formed by the joining of the two grooves of the two panels in each assembly. The section of the blade will have more or less clearance to facilitate its insertion.

Advantageously, the rectangular section of the blade, as indicated, has rounded edges to make it easier to slide the blade into the channel. According to another advantageous characteristic, the side opposite the attaching tab, having a nose, is reinforced by a boss adding to the rigidity of the connection between the nose and the tab. In this way, the elastic deformation of the attaching tab for the insertion of the locking blade into the channel, with the nose sliding into a position where it is clear of the inner face of the panel, is a deformation absorbed by the stop board without this deformation affecting the connection between the attaching nose and the end of the attaching tab which remains totally rigid. According to another advantageous characteristic, the face with the nose is parallel to the rear face of the blade and at a distance from it which is more or less equal to the thickness of the wall that exists between the channel and the inner face of the side.

With this arrangement, not only is the attaching tab parallel to the inner side of the panel but it bears practically against this inner side, reinforcing its hold increasingly as the attaching tab is applied against the inner side of the panel of this assembly.

Advantageously, the nose of the attaching tab only penetrates into one of the grooves receiving the bottom of the carcass, and not into the two grooves at the meeting point on the ridge of the dihedral shape.

According to another advantageous characteristic, around the channel (grooves), the sides have recesses that form a bearing surface around the opening of the channel, at a distance from the grooves receiving the bottom, a distance equal to the distance between the bottom of the board and the nose. These recesses, at a precise distance from the groove receiving the bottom, are a way of uniformizing the manufacturing of the locking devices whatever the size of the carcass, by the simple positioning of the recesses in the two panels at an appropriate distance from the bottom groove which is imposed by the gap required between the bottom and the bottom plane of the carcass sides.

According to another characteristic, the board is rectangular, and one side of the blade forms an extension of the front edge of the board, leaving a bearing strip on either side, delimited by the sides of the board.

According to another characteristic, the bearing strips are at least as wide as the width of the recess bearing surface to which such a strip is applied, depending on the relative assembly orientation of the two sides.

Advantageously, the board has a symmetrical structure with respect to its plane of symmetry passing through the board and the blade making the board entirely reversible and suitable for use for the four assemblies of a carcass which is also symmetrical with respect to a plane of symmetry.

According to another advantageous characteristic, the width of the bearing strips is more or less equal to that of the bearing surface of the recess of the side and the face of the attaching tab is perpendicular to the front face bringing it into contact with the inner side of the wall, depending on the relative orientation of the side assembly.

According to another advantageous characteristic, the board ends in a raised rounded end section (angle a) with respect to the lower plane surface.

Advantageously, the locking device according to the invention is made of plastic by injection moulding.

ILLUSTRATIONS

Figure 2A:
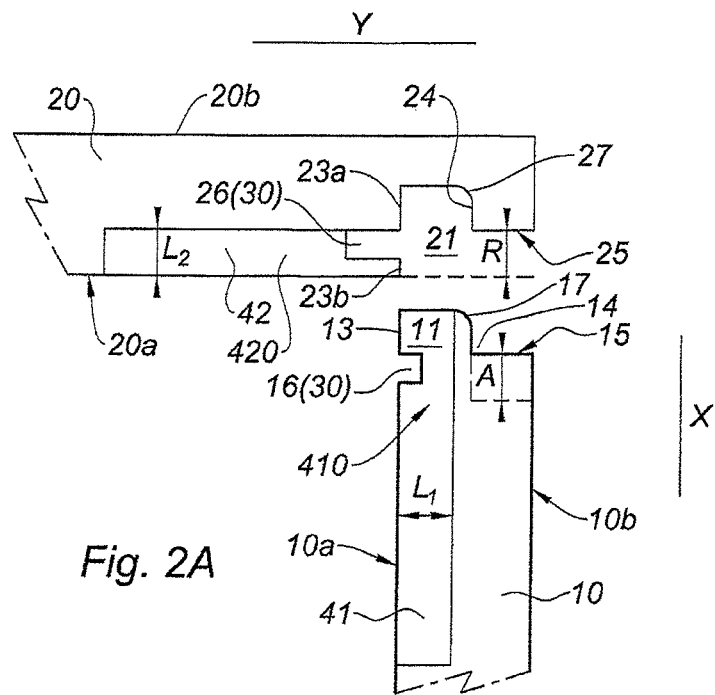
Figure 2B:
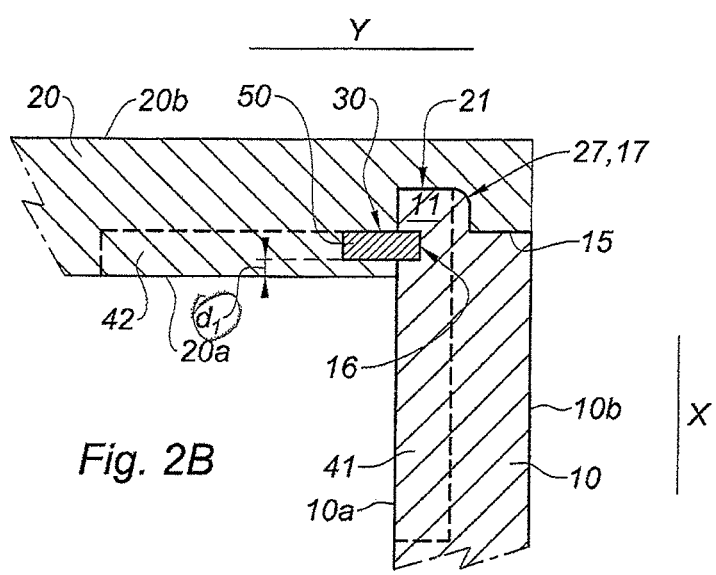

This invention will be described in the following with reference to the embodiment of a furniture carcass represented schematically in the attached illustrations in which:

FIG. 1 is a perspective view of an assembly corner of two panels forming two of the four sides of the furniture carcass, FIG. 2A is a plan view of the assembly end structure of two panels, before assembly, FIG. 2B is a sectional view of the dihedral assembly of the two panels in FIG. 2A.

Figure 2C:
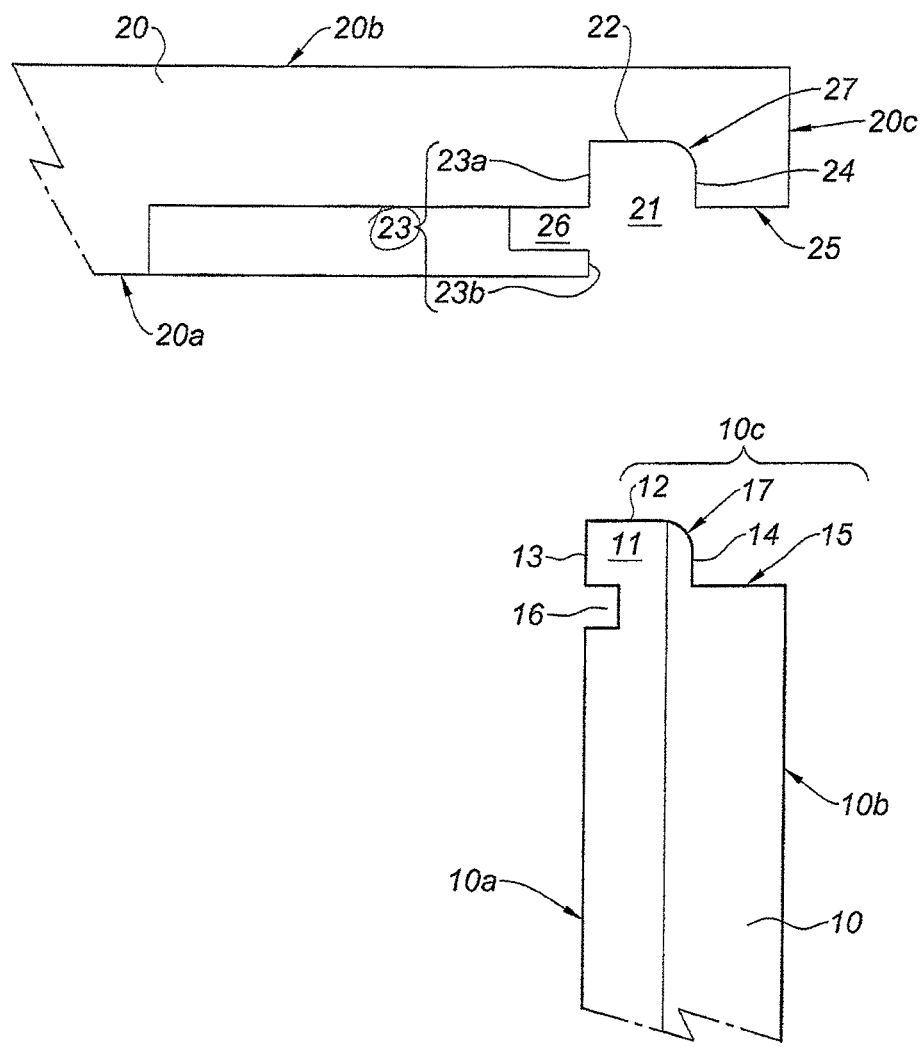
Figure 4:
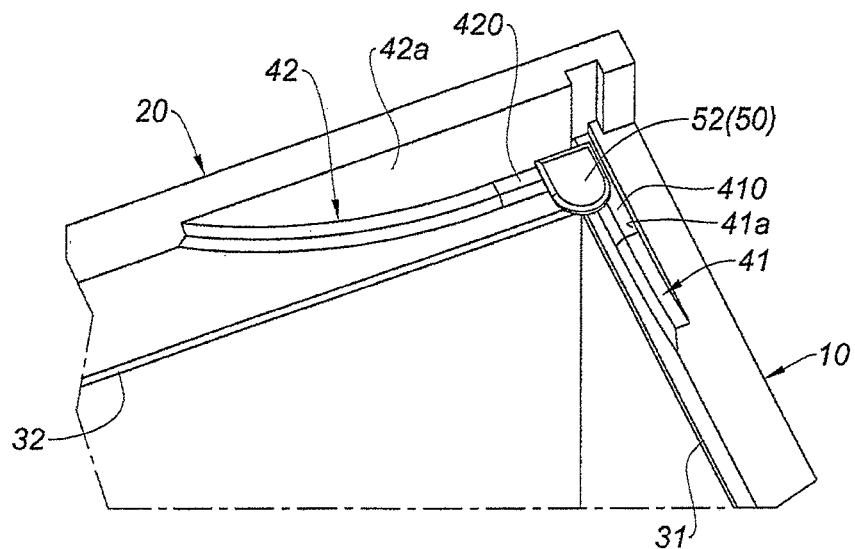
Figure 5:
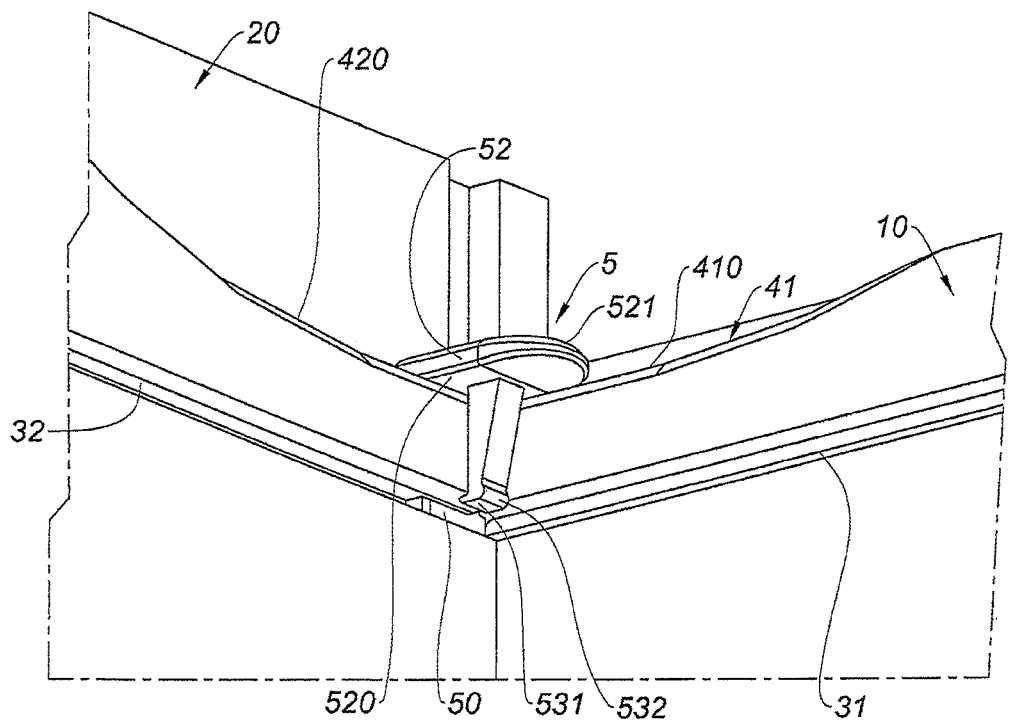
Figure 6:
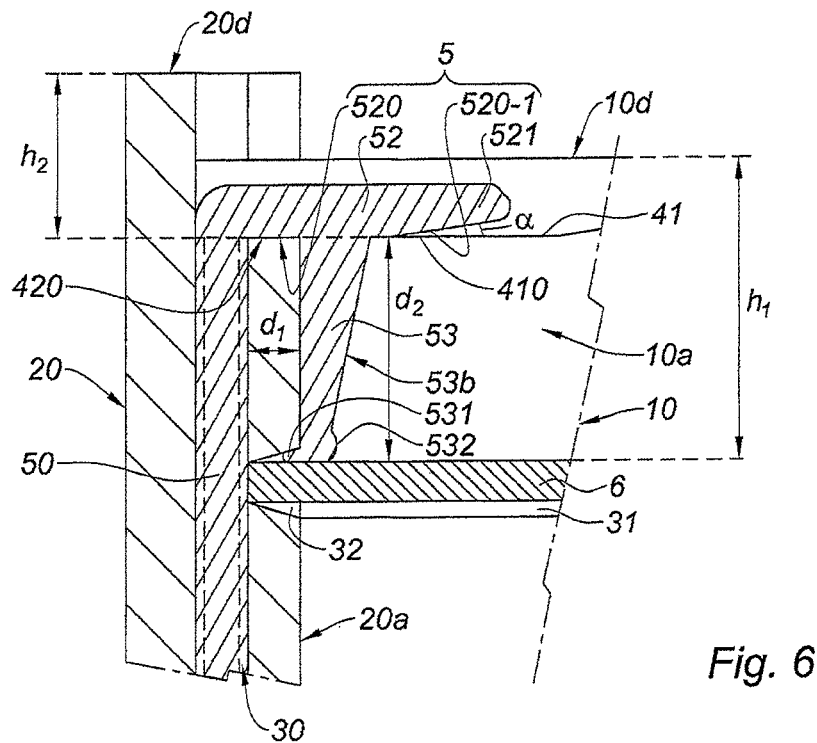
Figure 6A:
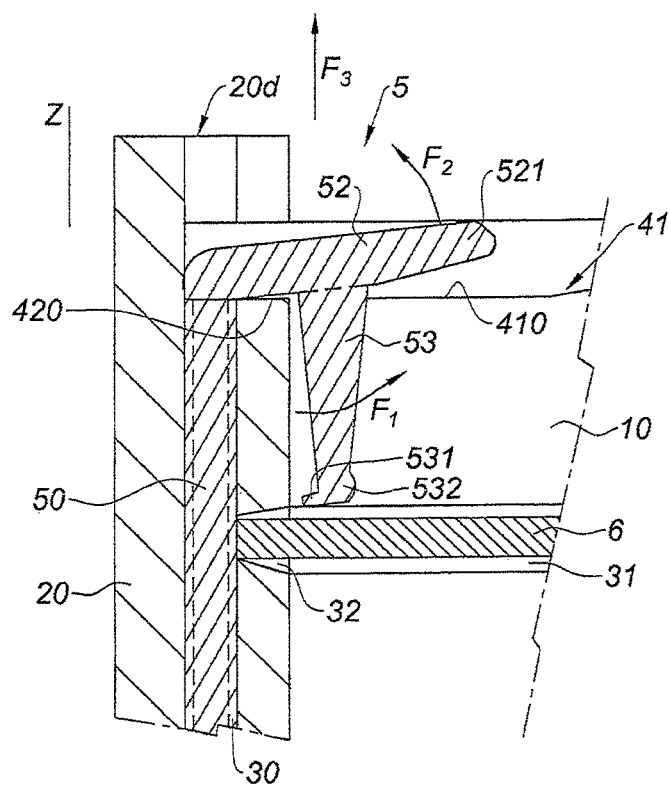
Figure 7:
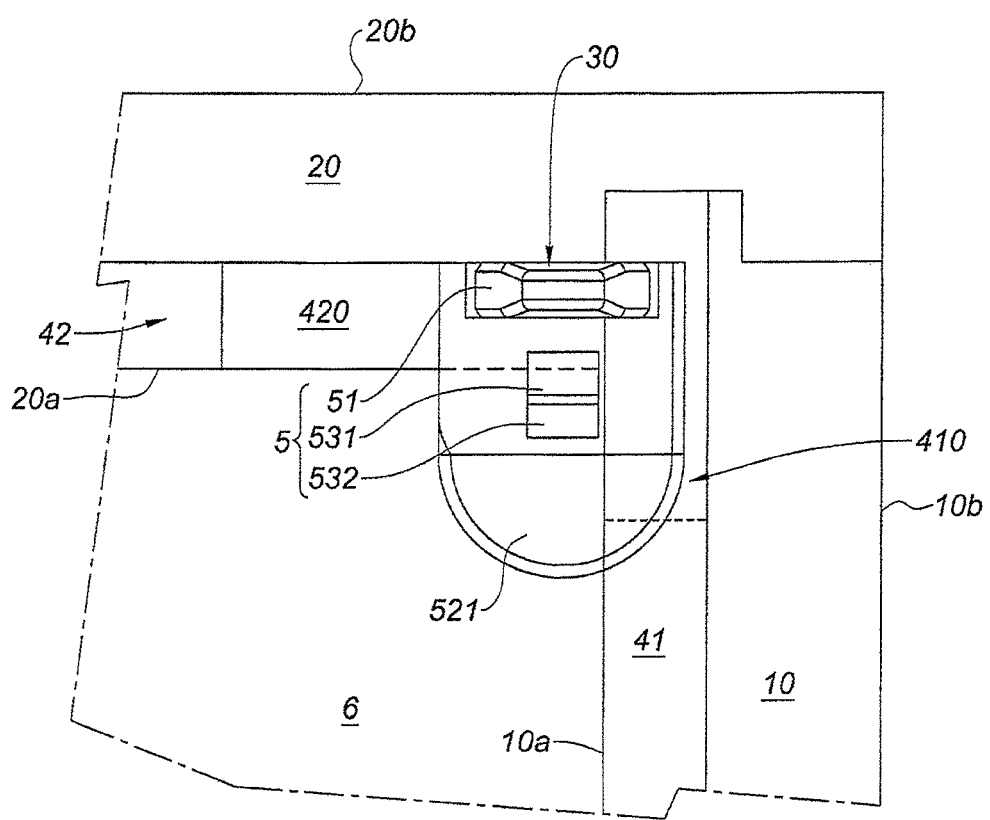

FIG. 2C is an enlarged view of the two edges of the panels before their assembly, FIG. 3 is a perspective view of a locking device to lock the dihedral assembly of two panels according to FIGS. 1, 2B, FIG. 3A is an enlarged scale detailed view of the end of the locking device in FIG. 3, FIG. 3B is a bottom view of the locking device 5, FIG. 3C is a sectional view of the locking tab, parallel with the bottom of the locking device board, FIG. 4 is a top perspective view, similar to that of FIG. 1, showing the locking of the assembly of two panels by the locking device according to FIG. 3, FIG. 5 is a bottom perspective view of the bottom of the dihedral assembly of FIG. 4, FIG. 6 is a sectional view of the assembly of two panels by a sectional plane parallel to the direction of the dihedral shape passing through the locking device, FIG. 6A is a sectional view similar to that of FIG. 6 showing the beginning of locking, FIG. 7 is a top view of the assembly of two panels showing, transparently, the various components assembled and locked by the locking device.

DESCRIPTION OF EMBODIMENTS OF THE INVENTION

The invention concerns a furniture carcass 100 consisting of panels 10, 20, assembled edge to edge by a loose tongue and groove assembly.

FIG. 1 shows the assembly area of two panels 10, 20 representative of the assembly of four panels of the carcass. The two assembled panels 10, 20 form a dihedral shape before being locked by a locking device.

To facilitate the description, the perspective view of FIG. 1 is completed by the three X, Y and Z axes of a reference in space. This reference is generally orthogonal because the carcasses are exclusively rectangular parallelepipeds. Nevertheless, the explanations and the description given below also apply to non-orthogonal directions.

Depending on the final orientation of carcass 100, direction C is a horizontal direction in the same way as one of the directions X or Z, while the other direction Y or X is then the vertical direction; the orientation of FIG. 1 has been chosen to simplify the description of the invention, all the more so since this orientation is generally the assembly orientation of the carcass 100 assembled in the inverted position, that is with the bottom facing up.

The side of carcass 100 shown in FIG. 1 is the bottom of the carcass defined by the X, Y plane, in this instance horizontal, but in the installed position it is vertical; the visible face of the carcass, possibly fitted with hinged or sliding doors is the hidden face; this face is also parallel to the plane (X, Y). These directions are also given in FIGS. 2A, 2B, 2C.

Details of the assembly shape of the two panels 10, 20 appear most clearly in FIGS. 2A, 2B, 2C. The finished and locked assembly is shown in the perspective view of FIGS. 4 and 5 and in the sectional view of FIG. 6.

According to the FIGS. 2A, 2B, 2C, panels 10, 20 have an inner side 10a, 20a and an outer side 10b, 20b.

The first panel 10 has a loose tongue 11 prolonging the inner side 10a and extending over the entire length of the edge of the panel 10; the tongue forms a front surface 12 and two side bearing surfaces 13, 14. One (14) of the surfaces—connects with a bearing surface of edge 15. The inner side 10a of the first panel 10, at the base of the loose tongue 11 has a locking groove 16 running parallel to the edge.

The front surface 12 connects with the side surface 14 by a truncated ridge 17, for instance, rounded off. Accordingly, the edge 10c of panel 10 is formed by a stepped surface consisting of surfaces 12, 17, 14, 15.

The second panel 20, near its edge, on inner side 20, has a groove 21 whose shape is complementary to that of the part of the surfaces 12, 17, 14 of the edge of the first panel 10.

This recess forms the assembly groove 21 designed to receive the loose tongue 11 and beyond the assembly groove, forms a bearing surface 25.

The assembly groove 21 is edged by a large bearing surface 23 consisting of two parts 23a, 23b and opposite them, a small bearing surface 24.

The bottom of the assembly groove 21 is formed by the surfaces 23, 22 and 24. The surface 22 of the bottom of the groove joins with the bearing surface 24 by a truncated inner ridge or concave ridge 27.

The truncated shape is preferably rounded to ensure total continuity between the surfaces 22 and 24. The truncated section of the concave ridge 27 imposes the truncated shape on the convex ridge 27 of the edge 10c of panel 10.

The concave ridge 27 is very important for the mechanical strength of the edge of the panel 20 behind edge 20c, to avoid creating incipient breaks at the junction point of the surface 22 and 24, for instance, during assembly if the relative orientation of the panels 10, 20 is slightly open with respect to the assembly angle (generally an angle of 90°). An assembly like this, especially if done by hand by nonspecialists, in the preliminary phase could include a defective orientation like this, even if slight. The truncated ridge 27 ensures the continuity of the panel material by providing it with the deformation elasticity of assembly groove 21, without generating incipient breaks.

This combination of shapes also avoids the risk of generating incipient breaks during the forcible engaging or extraction of the blade 50 of locking device 5. If blade 50 is forced into channel 30, it can create forces that tend to move apart the two locking grooves 16 and 26, corresponding to the thrust of tongue 11 against the bearing surface 24 which, by a leverage effect, may then attempt to open the angle between surface areas 22 and 24. The truncated shape of this concave ridge and the elasticity it produces serve to avoid this risk.

The large bearing surface 23 has a locking groove 26 in a position similar to that of the locking groove 16 of the first panel 10. When the two panels 10, 20 are joined together, the locking grooves 16, 26 form a locking channel 30. The locking groove 26 is parallel to the inner side 20a, at a distance d1 from it.

Generally, grooves 16 and 26 have a rectangular cross-section. For instance, they are cut with a circular saw and in the case of groove 26, the saw disc cuts the edge 20c of the panel 20 and at the same time, produces the bearing surface 25 and the groove 26.

The loose tongue 11 is inserted into the assembly groove 21. The bearing surface of edge 15 of the first panel 10 is brought up against the inner bearing surface 25 of the second panel 20. In this assembled position, shown in FIG. 2B, the two locking grooves 16, 20 join one another to form the channel 30, parallel to the assembly axis (direction Z) and receive the blade 50 of a locking device 5.

The locking grooves 16, 26 of the two panels 10, 20 are preferably stopped just before the ends of the two panels 10, 20 at the front, but open out at the rear of the panels. This allows the locking blade 50 to be inserted while preventing it from protruding from the front of the assembly, that is from the carcass For reasons concerning both manufacturing and the assembly solidity of the panels, the grooves 16, 26, produced in the same way as circular saw grooves, have accordingly a rectangular section and form a channel with a rectangular cross-section. This is the best shape to avoid weakening the edges of panels 10, 20. There is also a wall having thickness d1 between the groove 26 (channel 30) and the inner side 20a of the panel 20.

FIG. 2A illustrates that the inner bearing surface 25 of the second panel 20 stands back by a distance R from the plane of the inner side A of panel 20. Reciprocally, the bearing surface of edge 15 of the first panel 10 is advanced by a distance A.

According to FIG. 1, the rear side of the carcass 100 is closed by a bottom, not shown, fitting into the grooves 31, 32 made on the inner sides 10a, 20a of the panels 10, 20.

These grooves reveal the distance h1, h2 between the two grooves 31, 32 and the top 10d, 20d of each panel (according to the orientation of FIG. 1) of the panels 10, 20. These distances h1, h2 are different so that the panel 10 is under the plane parallel to the plane (X, Y) and contains the top 20d of the panel 20 and of the other panels, not shown, forming the carcass 100. Indeed, depending on how the carcass is used, as a kitchen furniture unit, for instance, it may be necessary for carcass 10 to be applied against the wall surface but for the bottom of the carcass to stand back from the wall leaving a technical void for the passage of cables or pipes that are not flush fitted or other technical parts of the building, which may form relief in the wall, or more simply to leave a ventilation gap.

The panels 10, 20 each have a recess 41, 42 on the inner side 10a, 20a, to reduce the thickness of the panel and connecting with channel 30 formed by the assembly of the two locking grooves 16, 26. The recesses 41, 42 can be seen in the perspective view of FIG. 1 and in the plan view of FIG. 2 A.

The two recesses 41, 42 each form a segment 410, 420 that is parallel to the plane (X, Y) around the open end of channel 30.

According to FIG. 2A, the recess 41 of the panel 10 has a width L1 from the inner side 10a to cover the groove 16 and protrude beyond it while the recess 42 of panel 20 having a width L2 covers the groove 26 but does not protrude beyond it in the direction of the thickness of panel 20.

This arrangement is shown in the sectional view of FIG. 2B by a sectional plane parallel to the plane (X, Y) showing in dotted lines the trace of the two recesses 41, 42 and their overlapping with channel 30 where the blade 50 of locking device 5 (FIG. 2B) is located.

Starting from the assembly edges, the recesses 41, 42 only take up a short length of panels 10, 20 as needed for their machining by a cutting bit or any other tool for the removal of material. Accordingly, the recesses 41, 42 are produced with a continuous profile but not extending significantly along the edge of the panel 10, 20 so as not to weaken this edge by excessive reduction of its thickness over its length.

The recesses 41, 42 form a plane bearing surface enclosing the opening out of channel 30 (a combination of grooves 16, 26) and receiving the bearing surface of the locking device 5 in each corner of carcass 100. They prevent the locking device 5 from bearing on the tops 10d, 20d of the carcass panels 10, 20.

These recesses and the flat segments 410, 420 thus form the bearing surfaces of the handle in the shape of board 52 of locking device 50 so that it does not stand proud of the bottom surface of the carcass, contained within the walls, and does not form any relief protrusions in the four rear corners of the carcass, which would prevent the carcass from being applied flat against a flat wall.

These recesses 41, 42 also provide means of establishing a uniform distance d2 between the bearing surface of the locking devices 5 and their attachment in the bottom groove of the carcass to uniformize the locking devices 5 and use the same locking device 5 whatever the distance (inset) of the bottom 6 with respect to the edge of panels 10, 20, that is the edge of the corresponding bottom panels.

The locking device 5 according to the invention (FIGS. 3A,3C) consists of a blade 50, forming a cylindrical rod having a rectangular section, terminating in a thinned end 51 to guide the blade 50 into channel 30 formed by the joining together of the two grooves 16, 26. The other end of the blade 50 is connected to a stop board 52 having an attaching tab 53 with a nose 531 forming a hook in the shape of a wedge, and a boss 532. The stop board 52 forms a grip for manoeuvring the locking device 5 for its insertion or extraction by hand.

In greater detail, according to the FIGS. 3A and 3B, the locking device 5 is more or less symmetrical in shape with respect to its middle plane MM (FIG. 3B) which is also the sectional plane of the FIGS. 6, 6A so that the same locking device 5 can be used in the four corners of the carcass since the last of them is on asymmetrical plane with the other two parallel sides 10 and the two parallel sides 20.

Accordingly, the locking device 5 is the same for the four dihedral corners of the carcass. It will always be installed in a channel 30 running parallel to the plane of the second panel 20, that is, in each of the two panels 20 of the carcass.

The stop board 52 has a main rectangular section the underside 520 of which is provided with blade 50 and the attaching tab 53. The rectangular part of the board is edged by two parallel sides 52c, 52d, connected by a side 52a. The blade 50 is level with side 52a of board 52 and on either side leaves a bearing strip edged by two sides 52c, 52d When installed, the end 52a faces the wall 42a of the recess 42 while side 52c comes against the wall 41a of the recess 41 so that the board 52 is guided when the blade 50 is pushed home into channel 30 and does not swivel with respect to blade 50.

The rectangular part of the board 52 ends in a rounded end 521 to facilitate gripping.

The underside 520 of the board 52 is plane, perpendicular to the direction Z of blade 50 and of tab 53.

Blade 50 is a cylindrical rod having a rectangular section and whose two large sides 50a, 50b connect to the small sides 50c, 50d by means of truncated ridges 50e, preferably rounded.

The blade 50 has a constant section over its entire length except at the end 51 which, as already pointed out, has a reduced shape and a rounded end 511.

The attaching tab 53 protruding from the underside 520 of board 52 has a pyramidal prismatic shape the larger base 533 of which is connected to the bottom 520 and its free and, or small base, supports a nose 531 opposite blade 50.

More specifically, according to section III-III the tab 53 shown separately (FIG. 3C), it is rectangular with:
an inner side 53a,
an outer side 53b,
a side 53d facing side 10a of panel 10,
a side 53c opposite side 53d.

The free end 534 of tab 53 ends on the inner side 53a by nose 531 and on the outer side 53b by boss 532 enclosing the connection with the nose 531 and strengthening or adding to the rigidity of the joint between the nose 531 and the tab 53. The nose 531 has a wedge-shaped section. The inner side 53a is parallel to side 50b of the blade 50, with gap d1 corresponding approximately to the thickness of the panel wall to be found between channel 30 and the inner side 20a of panel 20 (FIG. 2B).

The attaching tab 53 forms a relatively rigid structure so that the forces applied to nose 531 are transmitted to board 52 which then has an elastic reaction by clicking of the nose 531 into the groove 32 of panel 20.

The pyramidal shape with its rectangular section of locking tab 53 is similar to a reinforcing or buttressed shape guaranteeing that nose 531 engages efficiently. —

In this context, it should be underscored that the nose 531 only engages in groove 32 receiving the bottom 6 of the carcass in a panel 20 and not in this groove 32 and the groove 31 of panel 10 at the same time. This ensures a more secure elastic attachment and improves the efficiency of the attachment, adding to the stability of the assembly while facilitating and simplifying the locking process.

The stop board 52 approximately perpendicular to the direction Z of blade 50 has a rounded end 521 which is inclined at an angle (a) with respect to the surface of the plane bottom 520 of stop board 52.

The locking device 5 is preferably made of plastic.

FIGS. 4 and 5 show the positioning of the locking device 5, securing the assembly of the two panels 10, 20.

According to FIG. 4, when the locking device 5 is installed, its blade 50 is engaged in a channel 30 and the underside 520 of the stop board 52 bears against the surfaces 410, 420 of recesses 41, 42.

The attaching tab 53 is shaped and arranged to take a position in the corner of the dihedral of the two panels 10, 20.

The tab 53a, preferably having a rectangular section on at least two sides which are respectively the sides facing the inner sides 10a, 20a. Accordingly, side 53a, facing side 50b of blade 50 (FIG. 3A) is at a distance 50b of d1 which is approximately equal (two within the installation clearance) to the thickness of the wall remaining between channel 30 and the inner side 20a of panel 20.

The rectangular section pyramidal shape of the tab 53 of the locking device 5 appears especially clearly in FIG. 5, showing that this tab 53 fits into the dihedral of the two panels 10, 20 and its nose 531 fits into the groove 32 of panel 20; the bottom 6 of carcass 100 is not shown in this figure.

FIGS. 3A, 5 also show the boss 522 reinforcing the tab 53 at nose 531 to improve the rigidity of its connection to the body of tab 53 and force it to engage in the group 32 when the bottom 6 is already in place, while allowing an elastic clearance for its engaging and reciprocally its disengaging, for the disassembly of the locking device 5 and the removal of the carcass.

The sectional view of FIG. 6 shows the locking device 5 and its various parts with respect to the two panels 10, 20; this figure also shows the engaging of the nose 531 in the groove 32 of the panel 10 above the bottom 6 in order to retain the blade 50 in the channel 30, resisting shaking and vibration to which carcass 100 may be exposed, for instance, the vibration generated by the impact of closing the doors of the carcass or of nearby carcasses and which, even if the hinges are damped, always generate vibrations. It is particularly important that the blade 50 of the locking device 5 is and stays accurately aligned in channel 30.

The sectional view of FIG. 6 also shows that lower face 520 bears on the plane segments 410, 420 of recesses 41, 42 and the raised shape (angle a) of end 520-1 of the lower face at end 521 of board 52. The locking device 5 is installed by simply being pushed home once the panels 10, 20 have been joined as a dihedral. The tab 53 is then slightly deformed, at the same time as board 52, so that the protruding nose 531 is able to slide on the inner side 20a of panel 20. When the nose 531 is placed opposite groove 32 above bottom 6, it is elastically engaged in the groove 32 by clipping into place and striking the edge of groove 32 and the top edge of the bottom 6.

FIG. 6A shows the withdrawal movement of the nose 531 when the end 521 of board 52 (arrows F1, F2) is raised so that the locking device 5 (arrow F3) can then be removed.

The dimensions of the locking device 5 and its tab are determined to correspond to the sizes of the components of panels 10, 20 which work together with the locking device 5, as described above.

To recapitulate, once the locking device 5 has been installed, the bottom 520 of board 52 bears against the surfaces 410, 420 of the grooves; the nose 531 catches in the groove 32; tab 53 is applied in the hole of the dihedral formed by the two panels 10, 20.

The "transparent" top view of the locking of the assembly is given in FIG. 7, revealing clearly the overlapping of board 52 on segments 410, 420 of the recesses 41, 42 around channel 30.

End 521 of board 52 remains easily accessible for actuation as shown in the sectional view of FIG. 6A.

The locking device 5 is preferably made of plastic.

The assembly of carcass 100 is described for the corner between two panels 10, 20. In practice, assembly of the four dihedral shapes of the carcass 100 is carried out step by step because it is first necessary to insert bottom 6 before finishing the contour of the carcass by the assembly of all the panels.

To do this, one assembly process could consist in the successive assembly of the two dihedral shapes formed by a base panel 10 and by two panels 20 or by one base panel 20 and two adjacent panels 10, and to gradually lock the two assemblies by partially inserting the blade 50 of the two locking devices 5 into the respective channels 30 but without fully engaging it so as not yet to clip together the two noses in a groove 32, and not to obstruct the installation of bottom 6.

Then, bottom 6 is slipped into the two grooves 31, 32—depending on whether the assembly is at the base of panel 20 and two panels 10 or at the base of panel 10 and two panels 20. When the bottom 6 is fully engaged in the three grooves 31, 32 of the three panels, 10, 20, the fourth panel is put in place and the four dihedral assemblies are locked by the locking devices 5.

LIST OF MAIN COMPONENTS

5 Locking device
6 Bottom
10 First panel
10a Inner side
10b Outer side
10c Edge
10d Top
100 Carcass
11 Loose tongue
12 Front surface
13, 14 Side surfaces 15 Bearing surface
16 Locking groove
17 Truncated ridge
20 Second panel
20a Inner side
20b Outer side
20c Edge
20d Top
21 Assembly groove
22 Groove bottom surface
23 Lower bearing surface
23a, 23b Parts of surface 23
24 Small bearing surface
25 Lower bearing surface
26 Locking groove
27 Truncated concave ridge
30 Channel
31, 32 Grooves for bottom of carcass
41 Recess
410 Flat segment
42 Recess
420 Flat segment
50 Blade
50a, 5b Large faces of blade
50c, 50d Small faces of blade
50e Blade ridge
51 Thinned end of blade
511 End fitting
52 board
520 Surface beneath board
520-1 End of inner surface
521 Rounded side
52a End of board
52c, 52d Side of board
53 Tab
53a Inner side
53b Outer side
53c Side
53d Side
531 Nose
532
533 Large base
L1, L2 Widths of recess 41, 42
d1 Distance between inner side 20a of panel 20 and side 53a of tab 53
d2 Length of tab 53
h1, h2 Recess heights
X, Y, Z Direction axes

The invention claimed is:

1. A furniture carcass comprising panels assembled edge to edge in a loose tongue (11) and groove (21) method and having a bottom (6) sliding into grooves (31, 32) of the panels (10, 20) in which a first (10) and a second panel (20) are assembled by the edge of the first panel (10) which abuts on an inner side (20a) of the second panel (20) to form a dihedral, A on its edge, the first panel (10c) has along its edge (10c) along the inner side (10a), a loose tongue (11) having an advanced bearing surface (15) and a locking groove (16) at a base of the tongue (11) along the inner side (10a) of the first panel (10), B the second panel (20) comprising along an edge and on its inner side (20a) a complementary groove whose shape matches that of the edge (10c) of the first panel (10) with, on the one hand, a longitudinal assembly groove (21), having a shape matching that of the tongue (11) it receives and beyond the groove (21), a bearing surface (25) standing back from a plane of its inner side (20a) for receiving the advanced bearing surface (15), and a locking groove (26) parallel to the inner side (20a) of the second panel (20) opening out into the groove (21) in a position matching that of the locking groove (16) in the first panel (10) when the two panels (10, 20) are assembled, C by assembly, the loose tongue (11) fitting into the groove (21) and the locking grooves (16, 26) complement one another to form a channel (30) receiving a locking device (5, 50) slipped into the channel (30) to secure the loose tongue (11) in the groove (21), D the locking device (5) includes:
a board (52) forming a handle and an underside (520) of which is plane to form a board bearing surface on the assembled panels (10, 20), around an opening of the channel (30),
a rigid blade (51) integral with the underside (520) of the board (52) and having a rod shape, rectangular in section, matching that of the channel (30) so that it can be slipped into the channel (30),
an attaching tab (53) integral with the bottom (520) and terminating in a clipping nose (531) turned toward the blade (50) and designed for clipping into the groove (32) of the second panel (20) with the clipping nose (531), distant from the bottom (520) of the board (52) by a distance (d2) included between the board bearing surface of the panels (10, 20) around the opening of the channel (30) and the groove (31, 32) receiving the bottom (6),
characterized in that the fastening tab (53) is in the form of a truncated pyramid the large base of which is connected under (520) the board (52) and the small base of which ends in the nose (531).

2. The furniture carcass according to claim 1, characterized in that the blade (50) is a rod shape having a rectangular cross-section with rounded edges (50a).

3. The furniture carcass according to claim 1, characterized in that a side (53d), opposite a side (53a) comprising the nose (531) of the attaching tab (53), is reinforced by a boss (532) adding to the rigidity of the link between the nose (531) and fastening tab (53).

4. The furniture carcass according to claim 1, characterized in that a side (53a) with the nose (351) is parallel to a rear side (50b) of the blade (50) and at a distance (d1) from it which is more or less equal to a thickness of the wall that exists between the channel (30) and a face of the inner side (20a).

5. The furniture carcass according to claim 1, characterized in that around the channel (30), the panels (10, 20) have recesses (41, 42) that form a recess bearing surface around the opening of the channel (30), at a distance (d2) from the grooves (31, 32) receiving the bottom (6), the distance equal to a distance between the bottom (520) of the board (52) and the nose (531).

6. The furniture carcass according to claim 5, characterized in that the board (52) is rectangular and one side (50a) of the blade (50) forms an extension of a front edge (52c) of the board, leaving a bearing strip on either side, delimited by sides (52a, 52b) of the board (52).

7. The furniture carcass according to claim 6, characterized in that the bearing strips are at least as wide as a width of the recess bearing surface to which such strip is applied, depending on the relative assembly orientation of the two panels (10, 20).

8. The furniture carcass according to claim 7, characterized in that the bearing strips are approximately as wide as the width of the recess bearing surface on the panel (10) and a face (53*c*, 53*b*) of the attaching tab (53) is perpendicular to its front side (53*a*) in order to contact with the inner side (10*a*) of the wall (10) according to the relative orientation of the assembly of the panels (10, 20).

9. The furniture carcass according to claim 6, characterized in that the board (52) ends in a raised rounded end (521) section (angle a) with respect to the bottom (520).

* * * * *